US008652346B2

(12) United States Patent
Guo et al.

(10) Patent No.: US 8,652,346 B2
(45) **Date of Patent: *Feb. 18, 2014**

(54) FIRE-EXTINGUISHING AEROSOL COMPOSITION FOR COMMON ELECTRIC APPARATUSES

(75) Inventors: Hongbao Guo, Shaanxi (CN); Zanfeng Zhang, Shaanxi (CN)

(73) Assignee: Shaanxi J&R Fire Fighting Co., Ltd (CN)

( * ) Notice: Subject to any disclaimer, the term of this patent is extended or adjusted under 35 U.S.C. 154(b) by 115 days.

This patent is subject to a terminal disclaimer.

(21) Appl. No.: 12/668,375

(22) PCT Filed: Nov. 14, 2007

(86) PCT No.: PCT/CN2007/003212

§ 371 (c)(1), (2), (4) Date: Mar. 16, 2010

(87) PCT Pub. No.: WO2009/006767

PCT Pub. Date: Jan. 15, 2009

(65) Prior Publication Data

US 2010/0187465 A1 Jul. 29, 2010

(30) Foreign Application Priority Data

Jul. 10, 2007 (CN) .......................... 2007 1 0018219

(51) Int. Cl.

| | |
|---|---|
| ***A62D 1/00*** | (2006.01) |
| ***C06B 31/00*** | (2006.01) |
| ***C06B 31/02*** | (2006.01) |
| ***D03D 23/00*** | (2006.01) |
| ***D03D 43/00*** | (2006.01) |
| ***C08K 3/00*** | (2006.01) |
| ***C08K 3/10*** | (2006.01) |
| ***C08K 3/22*** | (2006.01) |
| ***C08K 3/26*** | (2006.01) |
| ***C09D 17/00*** | (2006.01) |
| ***C04B 26/06*** | (2006.01) |

(52) U.S. Cl.

USPC ..... 252/5; 252/2; 149/45; 149/61; 149/108.2; 149/109.2; 524/424; 524/425; 524/436; 524/437

(58) Field of Classification Search

USPC ................ 252/5, 2; 149/45, 61, 108.2, 109.2; 524/424, 425, 436, 437

See application file for complete search history.

(56) References Cited

U.S. PATENT DOCUMENTS

| | | | | |
|---|---|---|---|---|
| 2,936,834 | A * | 5/1960 | Gomory | 169/44 |
| 5,425,426 | A * | 6/1995 | Baratov et al. | 169/46 |
| 5,466,386 | A * | 11/1995 | Stewart et al. | 252/2 |
| 5,613,562 | A | 3/1997 | Galbraith et al. | |
| 6,024,889 | A * | 2/2000 | Holland et al. | 252/5 |
| 6,217,788 | B1 * | 4/2001 | Wucherer et al. | 252/5 |
| 2005/0242319 | A1 * | 11/2005 | Posson et al. | 252/2 |

FOREIGN PATENT DOCUMENTS

| | | | | |
|---|---|---|---|---|
| CN | 1386554 | * | 12/2002 | |
| CN | 1386554 | A | 12/2002 | |
| CN | 1526461 | A | 9/2004 | |
| CN | 1739820 | A | 3/2006 | |
| EP | 976424 | A1 * | 2/2000 | A62D 1/06 |

* cited by examiner

*Primary Examiner* — Harold Pyon
*Assistant Examiner* — Tanisha Diggs
(74) *Attorney, Agent, or Firm* — Leydig, Voit & Mayer Ltd.

(57) ABSTRACT

A fire-extinguishing aerosol composition for common electric apparatuses is disclosed, which includes oxidant, combustible, adhesive and additive. The composition of the present invention is characterized in that the oxidant is the mixture of the potassium salt and the strontium salt, in which the content of the potassium salt oxidant is more than or equal to 15 mass % to less than 20 mass % of the total mass of the composition, and the content of the strontium salt oxidant is more than 48 mass % to less than or equal to 52 mass % of the total mass of the composition. In the fire-extinguishing aerosol composition of the present invention, the mean particle diameter of all components is less than or equal to 50 μm. After quenching the fire in a space with the heavy current electric apparatus, the fire-extinguishing aerosol composition of the present invention can ensure that the insulation resistance of the common electric apparatus is ranged from 20MΩ to 100MΩ. The fire-extinguishing aerosol composition of the present invention is more reasonable than the prior art, friendly to the environment, and applicable to the common electric apparatuses.

11 Claims, No Drawings

FIRE-EXTINGUISHING AEROSOL COMPOSITION FOR COMMON ELECTRIC APPARATUSES

CROSS-REFERENCE TO RELATED APPLICATIONS

This is an application filed under 35 U.S.C. 371 of PCT/CN2007/003212, filed Nov. 14, 2007, which claims priority from CN 200710018219.4, filed Jul. 10, 2007.

FIELD OF THE INVENTION

The present invention belongs to the technical field of fire-extinguishing compositions, and relates to a fire-extinguishing aerosol composition suitable for extinguishing of Type A or Type B fire in relatively enclosed spaces, in particular, to a fire-extinguishing aerosol composition suitable for general electric apparatuses.

BACKGROUND OF THE INVENTION

The aerosol fire-extinguishing techniques emerged in the 1990s are fire-extinguishing techniques that are based on the intense oxidation-reduction reaction between oxidant and fuel, and utilize the chemical reaction of the resulted active inhibiting agent to prevent combustion and chain reaction of free radical groups in the flame, so as to achieve the purpose of fire-extinguishing. The aerosol fire-extinguishing technique mainly comprises three types: hot aerosol fire-extinguishing technique, cold aerosol fire-extinguishing technique, and fine water mist fire-extinguishing technique, among which hot aerosol fire-extinguishing techniques comprise pyrotechnic compound-based hot aerosol fire-extinguishing techniques and water-based hot aerosol fire-extinguishing techniques. At present, most pyrotechnic compound-based hot aerosol fire-extinguishing techniques employ solid pyrotechnic compound extinguishing agents composed of oxidant, combustible, adhesive, and combustion rate controller. As a substitute for halon, pyrotechnic compound-based hot aerosol extinguishing agents have significant advantages over other types of extinguishing agents, for example, they have high extinguishing efficiency, the structure of fire-extinguishing equipment is simple, there is no need for pressure container, the fire-extinguishing units can be modularized and combined as required, the extinguishing agents can be stored at normal temperature and normal pressure, the fire-extinguishing equipment is easy to service and maintenance, the extinguishing agents have long shelf life and low cost, no ozone depletion potential (ODP=0), low greenhouse warning potential (GWP), and high cost/performance. These extinguishing agents are favored in the market and can drive implementation of the halon replacement program.

In the prior art, nitrate alkali salts, especially potassium nitrate, are the first choice for oxidant in most pyrotechnic compound-based hot aerosol fire-extinguishing techniques, because they can meet the most requirements of the principles for component selection. In existing techniques of fire-extinguishing aerosol composition with single-component potassium nitrate as the oxidant, the most representative hot aerosol fire-extinguishing agent techniques are those disclosed in the Russian series patent group, such as patent applications RU2230726, RU2184587, RU2214848, RU2150310, RU2108124, RU2091106, RU2076761, RU2151135, RU2116095, RU2006239, RU2022589; and patent applications in other countries, such as WO0158530, WO9733653, WO9423800, U.S. Pat. Nos. 5,831,209, 6,042,664, 6,264,772, 5,573,555, 6,116,348, etc.; what take the second position are fire-extinguishing aerosol composition techniques that employ bi-component or multi-component oxidants mainly composed of potassium nitrate and/or potassium perchlorate and/or assisted with nitrates or carbonates of other alkali metals or alkaline earth metals, as disclosed in patent applications such as CA2250325, DE19915352, UA7773, EP0561035, WO2005023370, RU2157271, RU2098156, US20020121622, U.S. Pat. Nos. 5,423,385, 5,492,180, 5,425,426, 6,277,296, etc. As for selection of combustibles, there is a wide range of substances that can meet the principle for component selection. The organic or inorganic combustibles that can meet the requirements are selected on the premise of ensuring negative oxygen balance design, such as the combustibles disclosed in patent applications RU218458, RU2214848, US20010011567, U.S. Pat. No. 6,264,772, RU2157271, RU2050878, U.S. Pat. No. 5,831,209, WO9733653, EP0561035, etc. With respect to the water-based hot aerosol fir extinguishing agent techniques, the oxidants and combustibles selected are typically composed of ammonium nitrate, ammonium perchlorate, potassium nitrate, strontium nitrate, or guanidine nitrate and like components that can generate gas, moisture content, and metal solid particles on the premise of ensuring high oxygen balance design, such as those disclosed in patent applications U.S. Pat. Nos. 6,277,296, 6,093,269, 6,045,726, 6,019,861, 5,613,562, etc.

Above patented hot aerosol fire-extinguishing techniques were fire-extinguishing products favored in recent years for their advantageous features of high extinguishing efficiency, low price, convenient maintenance, etc. However, as the market application and further development of actual products, many drawbacks of existing techniques and products described above have been discovered. Recently, a great deal of application practices and research efforts have shown: fire-extinguishing agents with single-component or multi-component oxidants mainly composed of potassium nitrate produce strongly alkaline conductive substances (e.g., potassium hydroxide) that can cause secondary damage to the space and objects to be protected, although they have high fire-extinguishing efficiency. Especially, the moisture content and metal oxides produced by water-based hot aerosol fire-extinguishing agents tend to form strongly alkaline conductive substances, which may lead to damage or erode general electric apparatuses in instrument rooms, control rooms, generator rooms, battery cabinets, communication base stations, transformer substations, etc., and thereby result in irreparable consequences, when these products are used to extinguish fire in such environments. Moreover, if the resulting nitrous oxide can't be decomposed timely, it will have toxicity to human's nerve system. In view of the problems, some research institutions and manufacturers have put forth some hot aerosol fire-extinguishing schemes that have taken both fire-extinguishing efficiency and secondary damages into consideration, such as the technical scheme of aerosol fire-extinguishing agent with strontium nitrate as the only oxidant, as disclosed in patent application CN200510105449. However, the most severe drawback of that technical scheme is: though the technical scheme reduces secondary damages to general electric apparatuses, it severely degrades the fire-extinguishing efficacy of the fire-extinguishing agent. The fire-extinguishing compositions disclosed in patent application U.S. Pat. No. 5,613,562 and U.S. Pat. No. 5,609,210 employ strontium nitrate as the oxidant, which mainly acts as a power source to gasify another fire-extinguishing liquid that contains C—F bonds and C—H—F bonds and then spurt the liquid/gas to the fire; however, the resulting hydrofluoric acid has not only high toxicity but also high corrodibility. That technique belongs to a water-based hot aerosol fire-extinguishing technique. Though the fire-extinguishing composition disclosed in patent application U.S. Pat. No. 6,019,861 contains potassium nitrate or strontium nitrate component, the potassium nitrate or strontium nitrate component is only used as an additive or a co-oxidant, and the main oxidant is ammonium nitrate that must be subjected to phase stabilization; in addition, the main purpose of the potassium nitrate or strontium nitrate component is to provide high quality dilating gas. Though the fire-extinguishing composition has an advantage of lower temperature when it is used in the fire-extinguishing technique, it degrades the combustion rate and the gas generation rate. A pyrotechnic gas generating agent with high oxygen balance is disclosed in patent application U.S. Pat. No. 6,093,269. In the pyrotechnic gas generating agent, the highly concentrated strontium nitrate is mainly used to keep neutral balance between oxygen and fuel; the pyrotechnic gas generating agent is mainly used in propelling agent compounds for automobiles, gun thrusters, expansion devices, and air bags.

Existing techniques that are close to the technical scheme of the present invention are the techniques disclosed in patent applications CN1739820A, CN1150952C, and CN1222331C, wherein, CN1150952C and CN1222331C are former patent applications of the inventor. A drawback of the two techniques disclosed in patent applications CN1150952C and CN1222331C is: in terms of balance between fire-extinguishing efficacy and corrosion to electric apparatuses, no specific design is provided for the requirements for insulation of different electric apparatuses. However, different types of electric apparatuses have different withstand capability against electrostatic accumulation or acid-alkali corrosion at different severity levels; for example, for heavy current electric apparatuses such as generators, electric motors, high voltage or low-voltage apparatuses, electric networks, and cables, the insulation resistance usually should be ≥1MΩ and <20MΩ (see the standards of electric power industry of P. R. C., such as "Code for Quality Inspection and Assessment of Electric Apparatus Installation Engineering (Inspection of Engineering Quality of Rotating Motors)" (DL/T5161.7-2002), etc.); for general electric apparatuses such as communication apparatuses, computers, onboard electric apparatuses, and electric medical apparatuses, etc., the insulation resistance usually should be ≥20MΩ and <100MΩ (see standards of electronic industry of P. R. C. and standards of communication industry of P. R. C., standards of computer industry of P. R. C., such as "General Code for Semi-Conductor Integrated Circuits" (GB6649-86), "Handbook of Surface Insulation Resistance" (IPC9201), etc.); for precision electric apparatuses such as instruments and gauges and their substrates and PCBs, the insulation resistance usually should be ≥100MΩ (see standards of electronic industry of P. R. C., international standards of printed circuit industry, such as "Handbook of Insulation Performance and Quality of Electric Apparatuses for Printed Circuit Board Assembly) (IPC-CC-8308), "Requirements for Safety of Electronic Measuring Instruments" (GB4793), and "General Specification for General-Purpose Printed Circuit Board Connectors" (GJB1717-93), etc.). Since different electric apparatuses have different requirements for insulation resistance, it is inappropriate to use a fire-extinguishing composition with the same components for different electric apparatuses in terms of fire-extinguishing efficacy and cost. Therefore, the fire-extinguishing compositions disclosed in formers patent applications of the inventor are not perfect in terms of the design of components and contents, and must be refined for some technical features and parameters. In the prior art, no special technique on fire-extinguishing aerosol composition that can prevent or reduce secondary damages to electric apparatuses while not compromising the fire-extinguishing efficacy is found, except for the techniques described above.

SUMMARY OF THE INVENTION

In view of the drawbacks in the prior art, the object of the present invention is to provide a fire-extinguishing aerosol composition, which is more reasonable than those in the prior art, more environment-friendly, suitable for general electric apparatuses, and has high fire-extinguishing efficacy.

The inventor's in-depth study on hot aerosol fire-extinguishing technique in recent years has shown: the effective fire-extinguishing concentration depends on the quality and intrinsic physical and chemical properties of the fire-extinguishing agent. The combustion rate of the extinguishing agent depends on factors such as oxygen balance design and selection of oxidant and combustible, etc. To achieve the object of the present invention, more in-depth work must be done in several aspects: (1) design the fire-extinguishing capability with full consideration of ignition, safety, and chemical compatibility; (2) employ an oxidant that doesn't contain potassium salts solely, under the design principle of negative oxygen balance; (3) simplify the composition of compound as far as possible so as to avoid production of undesired substances.

By careful selection of oxidant and combustible, adjustment and tests of combustion reaction rate, tests of residue of fire-extinguishing aerosol, cooling tests, fire-extinguishing powder tests, moisture absorption and insulation tests of solid particles, etc., the inventor finally determine the technical scheme of aerosol fire-extinguishing compound applicable to general electric apparatuses described in the present invention.

The fire-extinguishing aerosol composition provided in the present is suitable for general electric apparatuses, and comprises oxidant, combustible, adhesive, and additive; wherein, the oxidant in the fire-extinguishing composition is a mixture of potassium salt oxidant and strontium salt oxidant; the combustible is guanidine nitrate, aminoguanidine nitrate, diaminoguanidine nitrate, or a combination thereof; the additive is aluminum powder, carbon powder, calcium carbonate, or a combination thereof; the adhesive is epoxy resin, phenolic resin, acrylic resin, or a combination thereof; in addition, the weight percents of the components in the fire-extinguishing compound are:

| | |
|---|---|
| Potassium salt oxidant: | ≥15% and <20%; |
| Strontium salt oxidant: | ≥48% and <52%; |
| Combustible: | 10%~25%; |
| Additive: | 2%~10%; and |
| Adhesive: | 2%~10%. |

DETAILED DESCRIPTION OF THE INVENTION

The strontium salt that can be used in the fire-extinguishing composition is strontium nitrate, strontium peroxide, strontium carbonate, strontium sulphite, strontium pyrophosphate, strontium bromide, strontium dichromate, strontium hexaboride, strontium permanganate, or a combination thereof; the potassium salt is potassium nitrate, potassium chlorate, potassium perchlorate, potassium chloride, potassium nitrite, potassium carbonate, potassium citrate, or a combination thereof; alternatively the potassium salt oxidant can be partially or completely replaced with sodium bicarbonate, sodium nitrate, sodium perchlorate, ammonium nitrate, ammonium perchlorate, barium nitrate, cesium nitrate, or a combination thereof.

The combustible that can be used in the fire-extinguishing composition in the present invention can be partially or completely replaced with pentaminotetrazole or salt thereof, bistetrazole or salt thereof, diazoaminotetrazole or salt thereof, diaminotetrazole dimer or salt thereof, or a combination thereof.

The additive that can be used in the fire-extinguishing composition in the present invention can be partially or completely replaced with pyrocatechol potassium borate or salt thereof, hydroxybenzoic acid or salt thereof, benzoic acid or salt thereof, palmitic acid or salt thereof, ammonium nitrate, potassium perchlorate, potassium chloride, copper oxide, ferric oxide, copper phthalocyanine, potassium ferricyanide, hexamethylenetetramine, or a combination thereof.

The adhesive that can be used in the fire-extinguishing composition in the present invention can be partially or completely replaced with polytetrafluoroethylene, ethylene polymer, nitrocellulose, trialdehyde glyceride, polyvinyl acetate, melamine resin, or a combination thereof.

The maximum mean diameter of oxidant, combustible, additive, and adhesive particles in the fire-extinguishing composition in the present invention is ≤50 μm.

In another preferred embodiment of the present invention, the fire-extinguishing aerosol composition comprises:

| | |
|---|---|
| Potassium nitrate: | 15%~9%; |
| Strontium nitrate: | 48%~51%; |
| Guanidine nitrate: | 10%~25%; |
| Aluminum powder: | 2%~10%; and |
| Phenolic resin: | 2%~10%. |

In another preferred embodiment of the present invention, the fire-extinguishing aerosol composition comprises:

| | |
|---|---|
| Potassium perchlorate: | 15%~19%; |
| Strontium peroxide: | 48%~51%; |
| Aminoguanidine nitrate: | 10%~25%; |
| Hydroxybenzoic acid or salt thereof: | 2%~10%; and |
| Acrylic resin: | 2%~10%. |

In another preferred embodiment of the present invention, the fire-extinguishing aerosol composition comprises:

| | |
|---|---|
| Potassium nitrite: | 15%~19%; |
| Strontium permanganate: | 48%~51%; |
| Pentaminotetrazole or salt thereof: | 10%~25%; |
| Ferric oxide: | 2%~10%; and |
| Epoxy resin: | 2%~10%. |

In another preferred embodiment of the present invention, the fire-extinguishing aerosol composition comprises:

| | |
|---|---|
| Potassium carbonate: | 15%~19%; |
| Strontium pyrophosphate: | 48%~51%; |
| Diazoaminotetrazole or salt thereof: | 10%~25%; |
| potassium ferricyanide: | 2%~10%; and |
| Polytetrafluoroethylene: | 2%~10%. |

After the fire in a space with the general electric apparatus is extinguished with the fire-extinguishing aerosol composition provided in the present invention, the insulation resistance of the general electric apparatus is 20~100MΩ.

The technical scheme of fire-extinguishing aerosol composition suitable for general electric apparatuses is determined by the inventor through careful selection and tests on components and mixing ratios of oxidant, combustible, adhesive, and additive. The results of repeated texts demonstrated that the insulation resistance of general electric apparatuses was greater than 20MΩ after the fire was extinguished. Compared to the prior art, the fire-extinguishing aerosol composition provided in the present invention attains achieves the object of avoiding secondary damages to general electric apparatuses after the fire is extinguished, while not compromising the fire-extinguishing efficacy, and is a new generation of special and high-efficiency fire-extinguishing aerosol composition.

DETAILED DESCRIPTION OF THE EXAMPLES

Hereunder the present invention will be described in details with reference to the examples. However, these examples shall not be deemed to constitute any limitation to the scope of the present invention.

The fire-extinguishing aerosol composition suitable for general electric apparatuses in the present invention was prepared according to the formula shown in the following table, and the insulation resistance of precipitant was measured as indicated in the following description.

| | Weight Percent of Component/% | | | | | | | | | |
|---|---|---|---|---|---|---|---|---|---|---|
| Component Name | Example 1 | Example 2 | Example 3 | Example 4 | Example 5 | Example 6 | Example 7 | Example 8 | Example 9 | Example 10 |
| Potassium perchlorate | | 19 | | | | | | 15 | | |
| Potassium nitrate | 18 | | | | | | | | | 18 |
| Potassium carbonate | | | | 19 | | | | | | |
| Potassium nitrite | | | 18 | | | | | | | |
| Potassium chlorate | | | | | | | | | | |
| Potassium citrate | | | | | | | 18 | | | |

-continued

| Component Name | Weight Percent of Component/% Example 1 | Example 2 | Example 3 | Example 4 | Example 5 | Example 6 | Example 7 | Example 8 | Example 9 | Example 10 |
|---|---|---|---|---|---|---|---|---|---|---|
| Potassium bicarbonate | | | | | | 19 | | | | |
| Barium nitrate | | | | | 17 | | | | | |
| Sodium nitrate | | | | | | | | | 16 | |
| Strontium nitrate | 51 | | | | | | | | | 50 |
| Strontium peroxide | | 48 | | | | | | | | |
| Strontium carbonate | | | | | 50 | | | | | |
| Strontium pyrophosphate | | | | 51 | | 49 | | | | |
| Strontium bromide | | | | | | | | 51 | | |
| Strontium permanganate | | | 51 | | | | 50 | | 51 | |
| Aminoguanidine nitrate | | 23 | | | | | | | | |
| Guanidine nitrate | 22 | | | | 23 | | 22 | | | 20 |
| Pentaminotetrazole | | | 22 | | | 21 | | 25 | | |
| Diazoaminotetrazole | | | | 23 | | | | | 24 | |
| Aluminum powder | 5 | | | | | | | | 4 | |
| Ferric oxide | | | 4 | | 5 | | | | | |
| Hydroxybenzoic acid | | 4 | | | | | | | | 6 |
| Copper oxide | | | | | | 5 | | | | |
| Potassium ferricyanide | | | | 2 | | | | 3 | | |
| Hexamethylene tetramine | | | | | | | 5 | | 5 | |
| Acrylic resin | | 6 | | | | | | | | 6 |
| Polytetrafluoroethylene | | | | 5 | 5 | | | 6 | | |
| Epoxy resin | | | 5 | | | | 5 | | | |
| Phenolic resin | 4 | | | | | 6 | | | | |
| Insulation resistance value of precipitant | 60 MΩ | 67 MΩ | 80 MΩ | 70 MΩ | 70 MΩ | 66 MΩ | 59 MΩ | 72 MΩ | 58 MΩ | 58 MΩ |

Note:

1. Acrylic resin: Type 104, produced by Xi'an Resin Plant; polytetrafluoroethylene: grain type, produced by Sichuan Chengguang Plant; epoxy resin: type E51, produced by Dalian Qihua Plant; phenolic resin: type F-23, produced by Hangzhou Shunxiang Plant.
2. Measure of the insulation resistance of precipitant of fire-extinguishing aerosol was carried out according to Clause 10.2 in GB499.1-2007. The testing devices included a test chamber (1 $M^3$ (1 × 1 × 1 m)), a megohmmeter with a measuring range of 0.1MΩ-500MΩ (ZC36 megohmmeter produced by Shanghai Precision Instrument Plant), culture dishes, a precision balance, and an aerosol generator.
3. The sample plates were 100 × 100 × 1 mm white PVC plates; 100 g aerosol generation agent was pressed into a cartridge with a diameter of 40 mm and a height of 100 mm under a pressure of 5 Mpa, and an electric starter was then equipped into the cartridge; next, the cartridge was placed into a mini-type generator; no coolant was added into the generator.
4. In the test, a clean sample plate was placed into a culture dish with nippers. The culture dish was placed on a test stand with a height of 250 mm in the center of a test chamber. The generator was placed at a corner in the test chamber, with the nozzle placed against the sample plate; the power wires were connected and the door of test chamber was closed; the device was powered on while counting the time with a second counter. After 20 min., the culture dish with the sample plate was taken out and the culture dish was removed into an environmental chamber at 35° C. temperature and 90% humidity and held for 30 min.; then, the test sample was taken out and the resistance was measured immediately.

The invention claimed is:

1. A fire-extinguishing aerosol composition suitable for general electric apparatuses, comprising oxidant, combustible, adhesive, and additive; wherein, the oxidant in the fire-extinguishing compound is a mixture of potassium salt oxidant and strontium salt oxidant; the combustible is selected from guanidine nitrate, aminoguanidine nitrate, diaminoguanidine nitrate, or a combination thereof; the additive is selected from aluminum powder, carbon powder, calcium carbonate, or a combination thereof; the adhesive is selected from epoxy resin, phenolic resin, acrylic resin, or a combination thereof; in addition, the weight percents of the components in the fire-extinguishing composition are:

| | |
|---|---|
| Potassium salt oxidant: | ≥15% and <20%; |
| Strontium salt oxidant: | ≥48% and <52%; |
| Combustible: | 10% to 25%; |
| Additive: | 2% to 10%; and |
| Adhesive: | 2% to 10%. |

wherein the strontium salt is strontium nitrate, strontium peroxide, strontium carbonate, strontium sulphite, strontium pyrophosphate, strontium bromide, strontium dichromate, strontium hexaboride, strontium permanganate, or a combination thereof;

wherein the potassium salt is potassium nitrate, potassium chlorate, potassium perchlorate, potassium chloride, potassium nitrite, potassium carbonate, potassium citrate, or a combination thereof; and wherein the aerosol composition has electrical properties such that after the fire-extinguishing aerosol composition is exhausted from the general electric apparatus, an insulation resistance of the general electric apparatus is within the range of 20 to 100MΩ.

2. The fire-extinguishing aerosol composition suitable for general electric apparatuses according to claim 1, wherein, the potassium salt oxidant is at least partially replaced with sodium bicarbonate, sodium nitrate, sodium perchlorate, ammonium nitrate, ammonium perchlorate, barium nitrate, cesium nitrate, or a combination of them.

3. The fire-extinguishing aerosol composition suitable for general electric apparatuses according to claim 1, wherein, the combustible is at least partially replaced with penta aminotetrazole or salt thereof, bitetrazole or salt thereof, diazoaminotetrazole or salt thereof, diaminotetrazole dimer or salt thereof, or a combination thereof.

4. The fire-extinguishing aerosol composition suitable for general electric apparatuses according to claim 1, wherein the additive is at least partially replaced with pyrocatechol potassium borate or salt thereof, hydroxybenzoic acid or salt thereof, benzoic acid or salt thereof, palmitic acid or salt thereof, ammonium nitrate, potassium perchlorate, potassium chloride, copper oxide, ferric oxide, copper phthalocyanine, potassium ferricyanide, hexamethylenetetramine, or a combination thereof.

5. The fire-extinguishing aerosol composition suitable for general electric apparatuses according to claim 1, wherein, the adhesive is at least partially replaced with polytetrafluoroethylene, ethylene polymer, nitrocellulose, trialdehyde glyceride, polyvinyl acetate, melamine resin, or a combination thereof.

6. The fire-extinguishing aerosol composition suitable for general electric apparatuses according to claim 1, wherein, the maximum mean diameter of the oxidant, combustible, adhesive, and additive particles is smaller than or equal to 50 μm.

7. The fire-extinguishing aerosol composition suitable for general electric apparatuses according to claim 1, wherein, the composition comprises:

| | |
|---|---|
| Potassium nitrate: | 15% to 19%; |
| Strontium nitrate: | 48% to 51%; |
| Guanidine nitrate: | 10% to 25%; |
| Aluminum powder: | 2% to 10%; and |
| Phenolic resin: | 2% to 10%. |

8. The fire-extinguishing aerosol composition suitable for general electric apparatuses according to claim 1, wherein, the composition comprises:

| | |
|---|---|
| Potassium perchlorate: | 15% to 19%; |
| Strontium peroxide: | 48% to 51%; |
| Aminoguanidine nitrate: | 10% to 25%; |
| Hydroxybenzoic acid or salt thereof: | 2% to 10%; and |
| Acrylic resin: | 2% to 10%. |

9. The fire-extinguishing aerosol composition suitable for general electric apparatuses according to claim 1, wherein, the composition comprises:

| | |
|---|---|
| Potassium nitrite: | 15% to 19%; |
| Strontium permanganate: | 48% to 51%; |
| Pentaminotetrazole or salt thereof: | 10% to 25%; |
| Ferric oxide: | 2% to 10%; and |
| Epoxy resin: | 2% to 10%. |

10. The fire-extinguishing aerosol composition suitable for general electric apparatuses according to claim 1, wherein, the compound comprises:

| | |
|---|---|
| Potassium carbonate: | 15% to 19%; |
| Strontium pyrophosphate: | 48% to 51%; |
| Diazoaminotetrazole or salt thereof: | 10% to 25%; |
| Potassium ferricyanide: | 2% to 10%; and |
| Polytetrafluoroethylene: | 2% to 10%. |

11. The fire-extinguishing aerosol composition suitable for general electric apparatus according to claim 6, wherein the potassium salt oxidant is potassium nitrate, the strontium salt oxidant is strontium nitrate, the combustible is guanidine nitrate, the additive is aluminum powder and the adhesive is phenolic resin.

* * * * *